United States Patent [19]

Keskkula et al.

[11] 4,366,289
[45] Dec. 28, 1982

[54] ACRYLATE-GRAFTED ELASTOMERS AS POLYMER MODIFIERS

[75] Inventors: Henno Keskkula; Donald A. Maass; Kathleen M. McCreedy, all of Midland, Mich.

[73] Assignee: The Dow Chemical Company, Midland, Mich.

[21] Appl. No.: 255,603

[22] Filed: Apr. 20, 1981

[51] Int. Cl.$^3$ .................... C08L 57/00; C08L 33/02
[52] U.S. Cl. ........................... 525/78; 525/76; 525/83; 525/84; 525/94
[58] Field of Search .............. 525/78, 83, 84, 76, 525/94; 267/4 AR

[56] References Cited

U.S. PATENT DOCUMENTS

| | | | |
|---|---|---|---|
| 3,264,373 | 8/1966 | Whitworth | 525/83 |
| 3,878,265 | 4/1975 | Shimamura | 525/76 |
| 3,956,424 | 5/1976 | Murayama | 525/76 |
| 4,078,018 | 3/1978 | Chagvel | 525/83 |
| 4,173,598 | 11/1979 | Garbiel | 525/84 |
| 4,251,645 | 2/1981 | Humme | 525/84 |

FOREIGN PATENT DOCUMENTS 46-7457  2/1971  Japan .................... 525/94

Primary Examiner—Paul Lieberman
Attorney, Agent, or Firm—R. B. Ingraham

[57] ABSTRACT

Nicely compatibilized polymer blends (i.e., "polyblends") exhibiting attendant physical properties which are generally improved over those intrinsically coincident with the individual polymeric ingredients therein are comprised, as fundamental Components therefor, of:

(A) a substantial and effectively compatibilizing quantity of a graft or block inter- or copolymer of methyl methacrylate (i.e., "MMA") and/or equivalent acrylate monomer(s) on or with a synthetic or natural rubber elastomer (i.e., "EL") substrate as a basic component of the polyblend which is referred to hereinafter as an MMA-grafted rubber concentrate or, by way of simplified acronymical definition of same, a "GRC(MMA)" which is constitutionally substantially if not entirely free of any non-interpolymerized polymethylmethacrylate (i.e., "PMMA") or equivalent homopolymeric or copolymeric inclusions; plus (B) a significant quantity of a hydrocarbonaceous and/or halo-hydrocarbonaceous polymer, copolymer and/or interpolymer (including graft and block copolymer forms having elastomeric constituents) of styrene (i.e., "ST") and/or another alkenyl aromatic monomer; and, as an additionally optional ingredient, (C) another polymeric ingredient (such as, but without limitation, ABS or an ABS-type resin) that in physically blended admixture with a Component (B) polymeric ingredient results in a composite exhibiting attendant physical properties that are generally inferior in comparison to those intrinsically coincident with the individual polymeric ingredients therein.

14 Claims, No Drawings

ACRYLATE-GRAFTED ELASTOMERS AS POLYMER MODIFIERS

BACKGROUND OF THE INVENTION

It is well known that diverse synthetic resinous materials are, by and large and inherently, mutually incompatible. Essentially because of this, physical admixtures of most given different polymers—such as those gotten from melt blending procedures—are usually opaque blended polymer (i.e., "polyblend") products. The theory and practice of polymer compatibility and blending is nicely documented as a recent presentation set forth in Polymer Blends, Vols. 1 and 2, by D. R. Paul and Seymour Newman, Academic Press (a Subsidiary of Harcourt Brace Jovanovich) Publishers of New York, San Francisco and London (1978).

There are, nonetheless, a fair number of known and established exceptions to the foregoing generality. U.S. Pat. Nos. 3,177,268; 4,083,896; and 4,113,798 and French Pat. No. 1,526,375 are indicative of this. Likewise, the copending, concurrently filed application of the present Applicants pertains, inter alia to impact modification of mass-made ABS (acrylonitrile-butadiene-styrene) and ABS-type resins by means of polyblending thereof with particular grafted acrylate polymers; the same having Ser. No. 255,956; filed Apr. 20, 1981 and entitled "Blends of Grafted Acrylate Polymers and Mass-Made ABS-type Resins".

Notwithstanding, the general incompatibility of polystyrene (i.e., "PS") and most other St (styrene) and the like polymers with PMMA (polymethylmethacrylate) is notoriously well known. The result of attempted mixing of such diverse polymer products is an invariably heterogeneous composition of less than desired properties. Thus, even the mixture of typical styrene/acrylonitrile (i.e., "SAN") copolymers with conventional rubber-modified, high impact polystyrene (i.e., "HIPS") causes reduction of impact strength-values of the involved HIPS. Analogously, due to the recognized incompatibility of the included PS and SAN in the involved matrixes, a markedly brittle blend (usually having less than about a 0.5 ft-lbs/in value in measured Izod Notched Impact strength taken at 73° F. which is 22.8° C.) is had when typical and conventional ABS and HIPS resins are admixed.

Thus, nothing in prior art appears to concern itself realistically with an effective means and composing technique to get well-propertied and remarkably compatibilized polymer blends of acrylate resins with various alkenyl aromatic polymerizates and even other polymer products and to get better and more satisfactory products therewith in the way so indigenously advantageous as in the present contribution to the art.

FIELD OF THE INVENTION

The instant advance in the art concerns exceptionally well compatibilized and attractively-propertied polyblends of certain GRC(MMA) (grafted rubber concentrate based on methylmethacrylate) materials and particular alkenyl aromatic polymerizates with possibly even other polymeric ingredients, all as hereinafter more fully delineated; as well as shaped and fabricated articles and products therefrom.

The achievement and provision of all of that which is indicated are amongst the principle aims and objectives of the invention; with even more and additionally other benefits and advantages derivable in and from present practice appearing and becoming more evident in the ensuing description and Specification.

SUMMARY OF THE INVENTION

This invention, in its genesis providing for the discovery on which it is based, concerns the well-compatibilized and physically attractive GRC(MMA)-containing polyblends and various shaped articles therefrom all pursuant to and as is in generic basic outline set forth as follows:

A compatibilized polyblend composition that is comprised, in intimate physical admixture of:

as the essential and compatibilization-facilitating component (A) of the polyblend:

between about 10 and about 60 percent by weight taken on total weight of polyblend, per se, in the involved composition (i.e., "wt. %") of a grafted rubber concentrate of an interpolymerized acrylate monomer (i.e., a "GRC") that is an interpolymerization product in graft- or block-copolymer form of:

(i) between about 60 and about 90 percent by weight of the interpolymerizate (i.e., "% by wt.") of a natural or synthetic rubber elastomer (i.e., an "EL"); and (ii) between about 10 and about 40% by wt. of an interpolymerizate containing in grafted and/or block-interconnected polymer form a polymerized monomer of the formula:

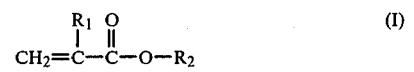

$$CH_2 = C - \underset{\underset{\|}{O}}{\overset{R_1}{C}} - O - R_2 \quad (I)$$

wherein each $R_1$ and $R_2$ is independently selected from the group consisting of hydrogen and lower alkyl units containing not more than about 4 carbon atoms; with said component (A) interpolymerizate being characterized in containing in its matrix not more than about 20% by wt. of free, unattached homopolymer or copolymer product(s) of Formula (I) monomer(s) which are not directly or indirectly chemically bonded to the EL in said interpolymerizate;

as the compatibilized component (B) polymerizate ingredient of the polyblend:

between about 90 and about 60 wt. % of a hydrocarbonaceous or halohydrocarbonaceous polymerizate containing polymerized therein at least about 50% by wt. of at least one monomer of the formula:

$$CH_2 = \underset{\underset{|}{G}}{C} - Ar \quad (II)$$

wherein G is selected from the group consisting of hydrogen and methyl and Ar is an aromatic radical including various alkyl- and halo-ring-substituted aromatic units containing from 6 to about 10 carbon atoms, with any balance of said component (B) polymerizate being an other than formula (II) hydrocarbonaceous or halo-hydrocarbonaceous monomer that is polymerizable with styrene (i.e., "St") and/or an EL that is interpolymerizable with St; plus as an optional component (C) polymeric ingredient of the polyblend:

from 0 to about 60 wt. % with the limitation that the selected proportion of component (C) added to components (A) and (B) must equal 100 wt. % in composition of all components of another polymeric ingredient different from said component (A) and said component (B) that is mixable with component (B) materials but whose physical blending therewith results in a composite admixture exhibiting attendant physical properties that are generally inferior in comparison to those intrinsically coincident with those of either said component (B) or said component (C).

Also contemplated within the scope of the invention is a fabricated article employing the foregoing compositions.

For immediate descriptive purposes the terms: "graft(ed) polymer or copolymer"; "graft polymerized or copolymerized"; "block polymer or copolymer"; "block polymerized or copolymerized"; etc., contemplate and are intended to embrace what may be called and are actually often referred to as "interpolymers", "interpolymerizing", "interpolymerization products", etc. of monomeric materials, such as MMA, St and so forth that are either: polymerized upon and to form attached chain superstrate combinations with preformed, polymerizeably-reactive substrates, such as polybutadiene (i.e., "PBD"); and/or additionally and otherwise polymerized in interconnecting chains attached between the preformed substrate units, and so forth; as is all well within the knowledge and comprehension of those skilled in the art.

PARTICULARIZED DESCRIPTION OF THE INVENTION

This invention, in basic essence and substance, involves polyblends that are advantageously compatibilized and rendered improved in physical properties and characteristics by the use and incorporation therein, as the fundamental and requisite component, of a substantial and effectively compatibilizing proportion of a GRC(MMA) or closely homologous acrylate graft, block or analogous interpolymer which is characterized in assay and by analysis in being at least substantially, if not entirely, free from chemically uncombined (directly or indirectly) inclusions of PMMA and/or other normal homo or copolymers of the involved acrylate monomer(s). The harmonious and beneficial coexistence of the respective intermixed components in polyblends according to the present invention depend upon and are made possible by the presence and function therein of the included GRC(MMA) or the like acrylate interpolymer component. In fact, the compatibilizing capability of the presently-contemplated and employed GRC(MMA) and the like components is so pronounced that in many instances they can be utilized to realize useful compositions in reclaiming operations of and with selected plastic refuse or mixed "recycle" resources and other preconditioned or presorted scrap or trash.

Generally, the GRC(MMA) and homologous acrylate interpolymers as well as many of the Component (B) materials and even some of those polymeric ingredients suitable for Component (C) incorporation in the polyblends of the present invention may be characterized as "rubbery" (or elastomeric) "graft" or "block" copolymers or interpolymers which are oftentimes in at least approximate, if not actual, "graft" copolymer form. They are, insofar as concerns the respective components of the presently-contemplated polyblends, various sorts and arrangements of a "rubbery" or "elastomeric" center or other possible "backbone" or "substrate" element (i.e., an "EL") to and upon or between which are attached the end or otherwise connected "grafts" or "blocks", as the case may be, of the interpolymerized monomer (i.e., "IPMon") units that are chemically bonded and attached to the EL elements in the interpolymerizate.

Many of the EL-containing interpolymerizates, especially those of the "graft" copolymer variety, are prepared by thermal or free-radical-catalyst-initiated polymerization techniques, either in mass or by solution or suspension polymerization procedures. On the other hand, a large number of them (especially those of the more typically "block" copolymer form) are preferably made by ionic, generally anionic, solution polymerization using an organometallic catalyst, such as sec.-butyl lithium, n-butyl-lithium or the like or equivalent catalyst as is explained in U.S. Pat. Nos. 3,322,734 and 3,404,134, as well as in many other well-known and widely available sources.

Typical architecture(s) of the EL-containing interpolymerizates are represented by the Structures:

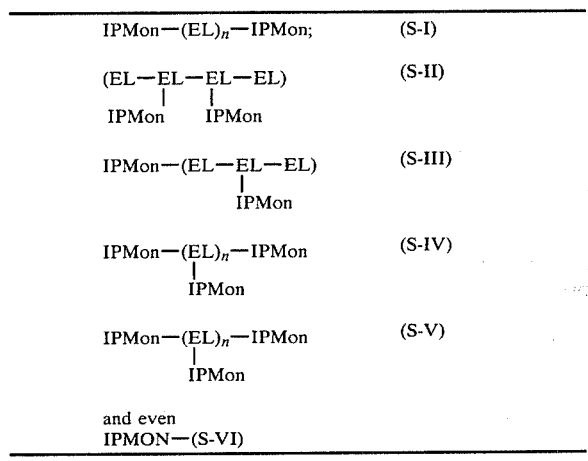

and the like, all wherein "n" is an integer which usually is but can alternatively depend in numerical value on the particular molecular weight (generally a weight average measurement—i.e., "$M_w$") or chain length of given interconnected EL units in the instances when they are ultimately so joined or formed.

Of course, in the Component (A) polymerizates of the polyblends of the present invention, interpolymerized MMA and/or at least one other acrylate monomer of the below-given Formula (I) constitute(s) the "Mon" part of the IPMon sector incorporated therein to make it, for example, an IPMMA unit. Likewise, in certain of the Component (B) Materials as well as in some of the Component (C) ingredients St and/or one or more other alkenyl aromatic monomers are the involved polymerized "Mon" parts so as to provide, by way of illustration, an IPSt configuration.

The S-I structure is quite common in commercially available block copolymers, particularly in St/PBD products. Structures S-III through S-V, inclusive, are and at least by analogy more or less in the nature of classically configured "graft" copolymer forms. Structures S-IV and S-V are frequently referred to as "starblocks" or "radial blocks". Structure S-VI interpolymerizates are sometimes referred to as "tapered" constructions and often have varying $M_w$ values and IPMon:EL ratios.

The MMA or equivalent monomers which are graft or block copolymerized, as an interpolymerizate, upon or with the PBD or other EL to provide the GRC(MMA) Constituent (A) for the polyblends of the present invention are of the general Formula (which includes MMA):

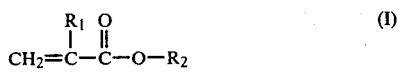

wherein each $R_1$ and $R_2$ is independently selected from the Group consisting of hydrogen and lower alkyl units containing not more than about 4 carbon atoms. Besides MMA, ethyl methacrylate and propyl and isopropyl methacrylate are, inter alia, good exemplifications of Formula (I) monomers useful to replace or for employment in combination with MMA for preparation of the (A) GRC(MMA) constituents in practice of the present invention.

When the graft copolymerized superstrate in the GRC(MMA) or like interpolymerizate for Constituent (A) comprises mixtures of Formula (I) monomers with other-than acrylate monomers that are copolymerizable with MMA, the latter (and advantageously more specifically in addition to those identified in the following in connection with the utilizable EL materials) may be or include any of such addition polymerizable vinyl monomers, or mixtures thereof, as: (i) vinyl halides, particularly vinyl chloride; (ii) various vinyl organic acid esters, such as vinyl acetate, vinyl propionate, etc.; (iii) vinylidene chloride; (iv) acrylic and methacrylic acid; and (v) maleic anhydride; as well as (vi) any of the below-mentioned Formula (II) monomers.

Advantageously, the quantity of Formula (I) monomer, particularly MMA, that is interpolymerized in the GRC(MMA) and the like materials to be employed as Component (A) constituents in and for the polyblends of the present invention is in an amount that is between about 10 and about 40 percent by weight, based on total weight of involved polymerizate (i.e., "wt. %"). Preferably, this content is between about 15 and about 25 wt. %; with an approximate 20 wt. % level being oftentimes most satisfactory for the purpose.

As has been indicated, it is of crucial importance for optimum results in practice of the present invention for the GRC(MMA) and/or closely homologous acrylate interpolymerizates to be at least substantially, if not entirely free of homopolymeric or copolymeric Formula (I) polymerizates which are not chemically bonded and combined with the EL in the interpolymer structure. The maximum tolerable content of free or unattached Formula (I) homopolymer or copolymer, such as PMMA, should not be in excess of about 20 wt. %; the same preferably being less than about 10 wt. %.

Such substantially pure GRC(MMA) and the like interpolymers can be prepared by the use of select polymerization techniques in the preparation that are adapted for such purpose. Or, GRC(MMA) and the like materials once prepared by any suitable means with an intolerable quantity of unattached Formula (I) homo- or copolymer can be solvent extracted to tailor their assay to requirements for Component (A) usage in practice of the invention. Sometimes, however, certain polyblends possible to prepare in accordance with the present invention may be made using a GRC(MMA) or the like interpolymer containing, upon initial incorporation in the polyblend, more than the specified tolerable analysis of Formula (I) unattached polymer which, for practical ultimate purposes, became dissociated from the immediate matrix formation in the elastomeric GRC(MMA) or the like interpolymerizate particles during the intermixing procedure so that in final result the incorporated Component (A) materials are in fact within the above-noted prescription(s) insofar as concerns free Formula (I) polymer therewith intimately associated.

The Component (B) polymerizate, as indicated, is a hydrocarbonaceous and/or halo-hydrocarbonaceous polymerizate (which, as mentioned and disclosed, can be if desired an EL-including graft or block copolymer which essentially comprises an alkenyl aromatic monomer, particular St, or mixture of such monomers, which are of the general Formula (which fundamentally includes St):

wherein G is selected from the group consisting of hydrogen and methyl and Ar is an aromatic radical (including various alkyl and halo-ring-substituted aromatic units) of from 6 to about 10 carbon atoms. These, frequently quite satisfactorily, include: α-methylstyrene; vinyl toluene; vinyl naphthalene; the dimethyl styrenes, t-butyl styrene; the several chlorostyrenes (such as the mono- and dichloro-variants); the several bromostyrenes (such as the mono- and dibromo-variants); and so forth.

It is generally desirable for the Component (B) polymerizates to contain at least about 50 wt. % of Formula (II) monomers, especially St, polymerized therein. More advantageously, this is frequently an at least about 80 wt. % content of the polymerized Formula (II) monomer(s). PS, of course, is a good selection in the Component (B) possibilities for utilization.

If and when a Component (C) material is desired to be incorporated in the polyblend products of the present invention along with Components (A) and (B), any one or more of a large number of polymeric materials may be utilized for the purpose. These, as has been explained, are those whose straightforward blending with only Component (B) materials generally results in an admixture composite having measurably inferior properties to those of either (or at least one) of the interblended polymeric constituents. Included in such possibilities are: vinyl chloride polymers and copolymers, particularly polyvinylchloride (i.e., "PVC"); various copolymers of St and other Formula (II) monomers, and acrylonitrile (i.e., the "SAN's"); copolymers of St and other Formula (II) monomers with various of the so-called vinyl acid monomers, such as St and acrylic acid copolymers (i.e., the "SAA's"), St and methacrylic acid copolymers (i.e., the "SMA's"), etc.; various polyesters and polyamides; alkylene oxide polymers and copolymers; polyolefins including polymers and copolymers of ethylene and propylene; and, quite significantly, various ABS and ABS-type resins.

As to the last-mentioned possibility for a Component (C) polymeric ingredient, the ABS and ABS-type resins contemplated are well-established and important plastics. They are not, however, and as has been noted, always advantageously blendable with Component (B)

ingredients, especially the rubber-modified high impact resins such as HIPS.

ABS and ABS-type resins have been known for many years. They are very nicely characterized as, by way of illustration, in "ABS Plastics" by Costas H. Basdekis, published in 1964 as part of its *Plastics Application Series* by Reinhold Publishing Corporation of New York.

ABS plastics can be satisfactorily made in a variety of ways.

One route for ABS manufacture is the mass technique, wherein the involved rubber (such as PBD) is directly dissolved in an appropriate mixture of St and acrylonitrile (i.e., "AN") followed by polymerization of the mass under the influence of applied effective agitation which is continued at least until the occurrance of the rubber phase inversion; after which polymerization is continued either in mass or in a suitable suspension of the mass in a medium such as water. Polymerization is allowed to proceed to a desired degree of conversion whereupon, usually with devolatilization, the desired ABS plastic product is obtained.

Other conventional preparations of more or less satisfactory ABS resins involve such procedures as: (i) blending any one or more of various suitable rubber latices with an SAN polymer; and (ii) polymerizing St and AN in the presence of a preformed rubber in latex form.

The composition of the various, including the mass-made, ABS resin(s) employed as Constituent (C) in practice of the present invention (and as may be satisfactorily obtained, for example, along the lines taught in U.S. Pat. No. 3,627,855) usually contains interpolymerized therein from about 20 to 35 parts by weight (i.e., "pbw") AN and from about 80 to 65 pbw St with between about 5 and about 18% by wt. PBD.

Equivalent ABS-type resins for instant purposes can be prepared with componential variations in place of or in mixture with the respective AN, St and PBD ingredients.

Thus, in and for the ABS-type resin, other cyanoalkylenes may be utilized along with or in place of AN. These, such as α-methacrylonitrile, are of the formula (which includes AN):

(III)

wherein R is selected from the group consisting of hydrogen and lower alkyl units containing not more than about 4 carbon atoms.

The EL component of which the GRC(MMA) and equivalent interpolymerizates for Constituent (A) is comprised, as well as in the possible EL-containing materials for Constituents (B) and (C), is oftentimes preferably PBD.

However, the EL utilized in preparation of Component (A) or for various of the Component (B), particularly HIPS, and Component (C), particularly ABS, possibilities may also be satisfactorily selected from a wide variety of generally sulfur-vulcanizable materials or mixtures thereof additional to PBD. It can, for example, be natural rubber (otherwise known as *Hevea Brasiliensis*). Much more often, however, and as the case with PBD, it is a conjugated diolefin homopolymer synthetic rubber (or elastomeric inter or copolymer composition of between about 25 and 90 wt. %) of a 1,3-diene of the Formula:

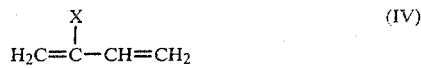
(IV)

wherein X is selected from the group consisting of hydrogen, chlorine and methyl radicals.

Examples of such conjugated diolefin polymer synthetic rubbers are, besides PBD: polyisoprene; BD/St copolymers (i.e., "SBR"); and BD/AN copolymers. The synthetic rubber may be solution-prepared or emulsion-prepared, be it a stereo-specific variety or otherwise.

Such conjugated diolefin polymer synthetic rubbers are polymers as is above indicated, of: butadienes-1,3, e.g., butadiene-1,3 (i.e., "BD"); isoprene; 2,3-dimethylbutadiene-1,3; and copolymers of mixtures of one or more such BD's (in a proportion of at least about 75% by wt. of such BD's) and, for example, of up to 25% by wt. the entire copolymerizable mass in such mixture of one or more monoethylenic compounds which contain a

(IVA)

grouping, wherein at least one of the connected $R_1$ and/or $R_2$ valences is attached to an electronegative group, that is, a group which substantially increases the electrical dissymmetry or polar character of the molecule.

Examples of compounds which contain the Formula (IVA) grouping and are copolymerizable with BD's are: the Formula (II) monomers, especially St; the unsaturated carboxylic acids and their esters, nitriles and amides, such as acrylic acid, methyl acrylate, ethyl acrylate, MMA, AN, α-methacrylonitrile, methacrylamide; vinylpyridines, such as 2-vinyl pyridine, 2-methyl-5-vinylpyridine; methylvinyl ketone, and methylisopropenyl ketone—all of which besides those above-mentioned in connection with the (B) Constituent are also copolymerizable with St and/or MMA (disregarding, for the explanation, MMA itself).

Other conventional unsaturated sulfur-vulcanizable rubbers may also be used as the EL material such as "EPDM" (rubbery terpolymer of ethylene, propylene and a copolymerizable non-conjugated diene such as 1,4-hexadiene, dicylopentadiene, dicylooctadine, methylenenorbornene, ethylidenenorbornene, tetrahydroindene, etc.) The analogous fluorocarbon, silicone and polysulfide rubbers may also be employed as an EL.

As is apparent, the polyblends of the present invention may be diblends, triblends or even blends of a greater number of involved polymeric ingredients, including, polyblend mixtures of one or more suitable (A) and (B) plus, if included, (C) Constituents.

To make the polyblends of and in pursuance with the present invention, the desired appropriate proportions of Constituents (A) and (B) and, if included, (C) are generally speaking and by any means appropos, physically admixed in such a way as will ensure very intimate and, for practical purposes, at least to the unaided eye homogenous interblending thereof. Most advantageously and generally preferably, the polyblends are prepared by melt blending of the respective constituents by mechanical admixture thereof on or in intensive compounding apparatus (such as, but not limited to extruders, masticating roll assemblies of the 2-roll mill and the like type, Banbury mixers and the like) at a temperature adequate to heat plastify the constituents being mixed but less than that which might occasion appreciable polymer decomposition therein or thereof.

In any event, the advantageous range(s) of proportions to utilize for constitution of the polyblends of the present invention is/are as set forth in the following tabulation:

TABLE I

Proportions of Components In Wt. % For Polyblends (With 100% Total Limit For Any Combination)

| Component | Weight Percent (A) | (B) | (C) |
|---|---|---|---|
| Generally Useful | 10–60 | 50–90 | 0–60 |
| Preferred | 15–25 | 75–85 | 0–30 |

The GRC(MMA) and like acrylate interpolymer-compatibilized polyblends pursuant to this invention can, if desired or required, be provided with and contain other additaments that are oftentimes included in such compositions, such as, by way of illustration: antioxidants; pigments; dyes; fillers (both pulverulent, particulate or fibrous); stabilizers; mineral oil and other plasticizers; blowing agents; and so forth.

As is also evident and will be apparent to those skilled in the art, the finally-obtained physical properties and other characteristics of the present polyblends depend, to greater or lesser extents and as can occur or be altered in and with given compositions, on both the particular types of respective Components employed, (including such factors as weight average molecular weight—i.e., "$M_w$"—therefore, presence or absence of various additives, etc.); and/or the EL utilized therein (including such factors as $M_w$, architectural structure, precise composition, the included EL proportion(s), etc.). A literal myriad of designable product variation and possibilities, with differing advantageous end use capabilities and adaptabilities, are obtainable by apt component and composition selection(s) pursuant to the instantly-disclosed practice(s).

In all of this, the basic principles and limitations relevant to polymerizations, copolymerizations and graft-, block- and inter-polymerizations as well as the provision of the GRC(MMA) and like interpolymers and other plastic materials hereinbefore set forth for use as Components are so widely known to and comprehended by those skilled in the art that detailed elaboration thereon is herein neither made nor attempted; the same being unnecessary for thorough understanding and recognition of the advance made possible by the contribution(s) of the instant development.

EXEMPLIFICATION OF THE INVENTION

The following illustrative examples show the great benefit of reduction to practice of the present invention. In them, all parts and percentages are given and to be taken on a weight basis and all temperature readings (unless otherwise specified) are in degrees Centigrade (°C).

In each illustration, the polyblends involved were prepared from granular stock. The Components to be blended were first physically mixed in measured quantities. This was followed by melting of the physical mixture on a 3×8 inch (ca. 7.62×20.32 centimeter) 2-roll mill. The front roll of the mill was kept supplied with steam at 200–240 psig so that its surface temperature was maintained at 160°–190°. The back roll of the mill was unheated. Each composite was milled for 5–7 minutes with frequent folding of the polyblend blanket being made. After the blending, each polyblend so made was compression molded into ⅛ inch (ca. 0.3175 centimeter) thick sheet from which suitably sized specimens were cut. Mechanical properties testing of the specimens was conducted by appropriated ASTM procedures. The Notched Izod (i.e., "N.I.") values, unless other noted, were determined at 22.8°, with results reported in ft-lbs/in. The Melt Flow Rate (i.e., "MFR") values were determined according to the American Society for Testing Materials Standard D-1238 condition "I", with results reported in grams (of flow)/10 minutes. Vicat heat distortion values, when made, were determined and reported in °C.

First Illustration

A series of polyblends were made using: as Component (A1), GRC(MMA)'s containing 78.1% and 77.3%, respectively, of PBD as the included El and having an unattached PMMA contents of about 7.1% and 9.7%, respectively (having been prepared excepting for appropriate ingredient variations generally in accordance with the method set forth in the First Illustration of the above referred to copending and concurrently-filed application of the Applicants); and, as Component (B1), various proportional combinations (including in some cases none of one or the other) of: "STYRON 666", a general purpose PS from The Dow Chemical Company, which is identified in the following tabulation as "$B1_a$"; and "STYRON 492", a rubber-modified HIPS containing 6.5% interpolymerized PBD from The Dow Chemical Company which is identified in the following tabulation as "$B1_b$".

The results were as set forth in Table II.

TABLE II

Physical Properties of Various Polyblends

| Sample No. | % Components In Polyblend (A1) | ($B1_a$) | ($B1_b$) | Total Percent Rubber Involved | N.I. | MFR |
|---|---|---|---|---|---|---|
| 1 | 18.8* | 0 | 81.2 | 20 | 5.9 | 0.064 |
| 2 | 25.6* | 74.4 | 0 | 20 | 4.4 | 0.53 |
| 3 | 23.3* | 50 | 26.7 | 20 | 5.1 | 0.21 |
| 4 | 21.1* | 25 | 53.9 | 20 | 5.5 | 0.31 |
| 5 | 19.4** | 80.6 | 0 | 15 | 0.6 | 2.3 |
| 6 | 32.3** | 67.7 | 0 | 25 | 5.4 | 0.08 |

*71.8% PBD content.
**77.3% PBD content.

The results obtained speak for themselves.

Second Illustration

The GRC(MMA) employed as Component (A2) was the same as that utilized in Samples 1–4 of the First Illustration. Component ($B2_a$) was "STYRON 666". Component ($B2_b$) was a Structure S-I type block copolymer from The General Tire & Rubber Company made from PS and PBD in the block copolymer form IPSt-PBD-IPSt containing about 40% PS and having a $M_w$ of about 555,000. Component ($B2_c$) was "KRATON 1101" (TM) product obtained from Shell Chemical Company, typifying another commercially-available Structure S-I material which is a IPSt -PBDD-IPSt triblock. Its $M_w$ was 93,000 and its PS content 29%.

The polyblends tested and the results obtained are set forth in Table III.

TABLE III

Physical Properties of Various Polyblends Including Block Copolymer Components

| Sample No. | % Components In Composition | | | | N.I. | MFR |
|---|---|---|---|---|---|---|
| | (A2) | (B2$_a$) | (B2$_b$) | (B2$_c$) | | |
| 7 | 25.6 | 69.4 | 5.0 | 0 | 7.5 | 0.24 |
| 8 | 25.6 | 69.4 | 0 | 5.0 | 6.9 | 0.46 |

Third Illustration

To show the deleterious effects of utilizing a GRC(MMA) containing an intolerable quantity of associated, unattached PMMA, two polyblends were made with "STYRON 492" as Component (B3). In one (Sample 9) and as Component (A3$_a$), the GRC(MMA) employed contained 59.2% PBD and had 29.1% of free PMMA. In another (Sample 10), the GRC(MMA) employed contained 78.0% PBD and had 6.8% of free PMMA. This was Component (A3$_b$). For purposes of comparison, two other polyblends (Samples 11 and 12) were made with "STYRON 492" and in one, as "HIPS$_a$", a graft rubber concentrate having St grafted onto PBr(GRC(St)$_a$ containing 82.7% PBD and, in the other, as GRC(St)$_b$, a rubber-modified impact PS containing 57.3% PBD. The results are included in Table IV.

TABLE IV

Showing Effect of Free PMMA In GRC (MMA) Component

| Sample No. | % Components In Composition | N.I. | | MFR |
|---|---|---|---|---|
| | | R.T. | 0° F. | |
| Blank | (B3) ("STYRON 492") | 1.9 | 1.2 | 11.5 |
| 9* | (A3$_a$) 17.1 + (B3) 82.9 | 1.9 | 1.2 | 5.7 |
| 10 | (A3$_b$) 11 + (B3) 89 | 4.1 | 2.3 | 0.7 |
| 11 | GRC (St)$_a$ 10.3 + (B3) 89.7 | 3.5 | 2.2 | 1.0 |
| 12 | GRC (St)$_b$ 15.6 + (B3) 84.4 | 4.2 | 2.5 | 2.2 |

*Clearly demonstrating harmful influence of incompatibility of PMMA with PS.

Fourth Illustration

To show experiences with a copolymer of styrene and acrylic acid, a number of polyblends was prepared employing as Component (C4) an SAA containing 7.5% AA. The GRC(MMA) utilized as Component (A4) was the same as Component (A3$_b$) for Sample 10 of the Third Illustration. Component (B4) was the same HIPS$_a$ employed for Sample 11 of the Third Illustration. Table V sets forth the results.

TABLE V

Including SAA In Various Polyblends

| Sample No. | % Components In Composition | | | % Total Rubber | N.I. | | MFR |
|---|---|---|---|---|---|---|---|
| | (A4) | (B4) | (C4) | | R.T. | 0° F. | |
| 13** | 32.1 | 0 | 67.9 | 25 | 0.8 | — | — |
| 14*** | 0 | 30.2 | 69.8 | 25 | 0.9 | — | — |
| 15 | 12.4 | 16.1 | 71.5 | 23 | 3.4 | 1.3 | 0.05 |
| 16 | 15.4 | 13.1 | 71.5 | 23 | 3.8 | 1.3 | 0.15 |
| 17 | 9.4 | 14.1 | 71.5 | 23 | 1.5 | 0.9 | 0.11 |

*Proportioned to give indicated rubber content.
**Mixture dispersed.
***Mixture clumpy.

Fifth Illustration

The same SAA as employed in the Fourth Illustration but here designated Component (C5) was employed to prepare another series of polyblends. As Component (A5) there was utilized a GRC(MMA) containing 77.3% PBD with a free PMMA content of 9.7%. Component (B5$_a$) was the same General Tire block copolymer employed in the Second Illustration and Component (B5$_b$) was "KRATON 1101".

The results obtained are shown in Table VI below.

TABLE VI

Additional SAA Polyblends

| Sample No. | % Components In Composition | | | | Total Rubber | N.I. | MFR | Vicat |
|---|---|---|---|---|---|---|---|---|
| | (A5) | (B5$_a$) | (B5$_b$) | (C5) | | | | |
| 18 | 19.4 | 0 | 0 | 80.6 | 15 | 0.4 | 2.0 | 121 |
| 19 | 19.4 | 5 | 0 | 75.6 | 20 | 0.6 | 0.6 | 121 |
| 20 | 19.4 | 10 | 0 | 70.6 | 25 | 1.9 | 0.2 | 121 |
| 21 | 19.4 | 0 | 5 | 75.6 | 20 | 0.4 | 1.1 | 120 |
| 22 | 19.4 | 0 | 10 | 70.6 | 25 | 1.6 | 1.5 | 119 |

The excellence of the polyblends prepared in accordance with the invention is readily evident from the foregoing.

Sixth Illustration

To show experiences with an ABS resin, a number of polyblends were prepared employing as Component (C6) a mass-made ABS containing 13.5% PBD which was obtained from The Dow Chemical Company under the trade designation "DOW ABS 500". "STYRON 492" was Component (B6) and Component (A6) was a GRC(MMA) containing 79% PBD with a free PMMA content of 6.6%. The results are given in the following Table VII.

TABLE VII

Including ABS In Various Polyblends

| Sample No. | % Components In Composition | | | Total Rubber | N.I. | MFR |
|---|---|---|---|---|---|---|
| | (A6) | (B6) | (C6) | | | |
| 23 | 0 | 50 | 50 | 10 | 0.4 | 13.2 |
| 24 | 10 | 45 | 45 | 16.9 | 1.1 | 0.8 |
| 25 | 20 | 40 | 40 | 23.8 | 3.5 | 0.07 |
| 26 | 30 | 35 | 35 | 30.7 | 5.2 | 0.01 |

Analogous good results are obtained in pursuit of the invention by making polyblends of the same or differing GRC(MMA)'s and homologous acrylate interpolymers using other hydrocarbonaceous and halo-hydrocarbonaceous alkenyl aromatic polymerizates therein along with differing third component polymeric ingredients, if desired.

Many changes and modifications can readily be made and adapted in specifically altered embodiments in accordance with the present invention without substantially or materially departing from its apparent and intended spirit and scope, all in pursuance and accordance with same as it is set forth and defined in the hereto-appended claims.

What is claimed is:

1. A compatibilized polyblend composition that is comprised, in intimate physical admixture of:
   as the essential and compatibilization-facilitating component (A) of the polyblend:
   between about 10 and about 60 percent by weight taken on total weight of polyblend, in the involved composition of a grafted rubber concentrate of an interpolymerized acrylate monomer that is an interpolymerization product in graft- or block-copolymer form of:
(i) between about 60 and about 90 percent by weight of the interpolymerizate of a natural or synthetic rubber elastomer; and
(ii) between about 10 and about 40% by weight of an interpolymerizate containing in grafted and/or block-interconnected polymer form a polymerized monomer of the formula:

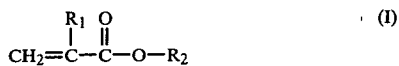

wherein each $R_1$ and $R_2$ is independently selected from the group consisting of hydrogen and lower alkyl units containing not more than about 4 carbon atoms; with
said component (A) interpolymerizate being characterized in containing in its matrix not more than about 20% by weight of free, unattached homopolymer or copolymer product(s) of Formula (I) monomer(s) which are not directly or indirectly chemically bonded to the elastomer in said interpolymerizate;
as the compatibilized component (B) polymerizate ingredient of the polyblend:
between about 90 and about 60 weight percent of a hydrocarbonaceous or halohydrocarbonaceous polymerizate containing polymerized therein at least about 50 percent by weight of at least one monomer of the formula:

wherein G is selected from the group consisting of hydrogen and methyl and Ar is an aromatic radical including various alkyl- and halo-ring-substituted aromatic units containing from 6 to about 10 carbon atoms, with
any balance of said component (B) polymerizate being an other than formula (II) hydrocarbonaceous or halo-hydrocarbonaceous monomer that is polymerizable with styrene and/or an elastomer that is interpolymerizable with styrene; plus
as an optional component (C) polymeric ingredient of the polyblend:
from 0 to about 60 weight percent with the limitation that the selected proportion of component (C) added to components (A) and (B) must equal 100 weight percent in composition of all components of another polymeric ingredient different from said component (A) and said component (B) that is mixable with component (B) materials but whose physical blending therewith results in a composite admixture exhibiting attendant physical properties that are generally inferior in comparison to those intrinsically coincident with those of either said component (B) or said component (C).

2. The polyblend composition of claim 1 comprised of:
from about 15 to about 25 weight percent of said component (A);
from about 75 to about 85 weight percent of said component (B); and, optionally
from 0 to about 30 weight percent of component (C).

3. A polyblend composition in accordance with that of claim 1 wherein said component (A) interpolymerizate contains not more than about 10 percent by weight of free Formula (I) polymerizate therein.

4. A polyblend composition in accordance with that of claim 2, wherein said component (A) interpolymerizate contains not more than about 10 percent by weight of free Formula (I) polymerizate therein.

5. A polyblend composition in accordance with any of those of claim 1, wherein said formula (I) monomer is methylmethacrylate.

6. A polyblend composition in accordance with any of those of claim 1, wherein said elastomer is polybutadiene.

7. A polyblend composition in accordance with any of those of claim 1, wherein
said formula (I) monomer is methylmethacrylate and said elastomer is polybutadiene.

8. A polyblend composition in accordance with any of those of claim 1, wherein said formula (II) monomer is styrene.

9. A polyblend composition in accordance with any of those of claim 1, wherein
said formula (I) monomer is methylmethacrylate;
said elastomer is polybutadiene; and
said formula (II) monomer is styrene.

10. A polyblend composition in accordance with any of those of claim 1, wherein said optional component (C) ingredient is a copolymer of styrene and acrylic acid.

11. A polyblend composition in accordance with any of those of claim 1, wherein said optional component (C) is an ABS resin.

12. A polyblend composition in accordance with any of those of claim 1, wherein:
said formula (I) Monomer is methylmethacrylate;
said elastomer is polybutadiene;
said formula (II) monomer is styrene; and
said optional component (C) ingredient is an styrene-acrylic acid copolymer.

13. A polyblend composition in accordance with any of those of claim 1, wherein:
said formula (I) monomer is methylmethacrylate;
said elastomer is polybutadiene;
said formula (II) monomer is styrene; and
said optional component (C) ingredient is an ABS resin.

14. As an article of manufacture, one that is shaped and fabricated from a composition that is in accordance with the composition of claim 1.

* * * * *